United States Patent [19]

Vig

[11] Patent Number: 5,163,790
[45] Date of Patent: Nov. 17, 1992

[54] REAMER WITH INTERCHANGEABLE CUTTER HEAD

[75] Inventor: Istvan Vig, Bettlach, Switzerland

[73] Assignee: Polytool AG, Bettlach, Switzerland

[21] Appl. No.: 847,361

[22] Filed: Mar. 6, 1992

[30] Foreign Application Priority Data

Mar. 13, 1991 [CH] Switzerland ............ 755/91

[51] Int. Cl.⁵ ............................................. B23B 51/00
[52] U.S. Cl. ......................................... 408/57; 279/8;
  408/233; 408/239 R
[58] Field of Search ............ 408/57, 60, 161, 171,
  408/200, 227, 233, 239 R, 713; 409/234; 279/8

[56] References Cited

U.S. PATENT DOCUMENTS

| | | |
|---|---|---|
| 1,439,567 | 12/1922 | Maupin . |
| 2,383,688 | 8/1945 | Seiter ...................... 279/8 |
| 2,796,264 | 6/1957 | Schiler ..................... 279/97 |
| 3,320,833 | 5/1967 | Andreasson . |
| 4,040,765 | 8/1977 | Vig ...................... 408/239 A |
| 4,606,680 | 8/1986 | Striegl .................... 408/713 |
| 4,705,435 | 11/1987 | Christoffel ............... 408/59 |
| 5,026,224 | 6/1991 | Andersson et al. ........ 279/8 |

FOREIGN PATENT DOCUMENTS

| | | |
|---|---|---|
| 3314591 | 10/1984 | Fed. Rep. of Germany .......... 279/8 |
| 666643 | 8/1988 | Switzerland . |
| 1160769 | 8/1989 | United Kingdom . |

Primary Examiner—Daniel W. Howell
Attorney, Agent, or Firm—Goodman & Teitelbaum

[57] ABSTRACT

The reamer having an interchangeable cutter head and a coolant-lubricant feed (24, 25, 26, 27) supplying the cutter head from outside includes a coaxial opening (2) for receiving the cutter head, which is cylindrical. The end of the coaxial opening nearest the reamer shank (1) is provided with an outwardly opening first cone (13), the conical surface of which is provided with deepened portions (14) at three locations. The cutter-head shank (4) is cylindrical and insertable in the coaxial opening of the reamer shank until a thickening forming a second cone (12) rests against the first cone of the reamer shank. By means of a clamping bolt (8) passing through the cutter head, the second cone can be pressed into the first cone, which becomes deformed. This deformation also affects the wall of the reamer shank in the front region of the coaxial opening, whereby the cutter-head shank is likewise held. The clamping bolt can additionally be used for expanding the cutter head.

7 Claims, 2 Drawing Sheets

REAMER WITH INTERCHANGEABLE CUTTER HEAD

This invention relates to rotary cutting tools, and more particularly to a reamer with an interchangeable cutter head, of the type having a reamer shank with a coaxial opening at one end for receiving the cutter-head shank, threaded coupling parts for mounting the cutter head in the reamer shank, means for transmitting the torque from the reamer shank to the cutter head, and a coolant-lubricant supply.

Reamers of this type have already been proposed. U.S. Pat. No. 4,040,765, for example, shows a reamer having an interchangeable cutter head with a conical connection piece. This cone of the cutter head is inserted in a matching receiving aperture in the reamer shank. The cutter head is screwed to the reamer shank via a screw bolt. By means of the conical seat between the cutter head and the reamer shank, a connection free from play is ensured.

However, this conical seat has the drawback that, particularly in the case of fairly strong feeding forces, the cutter head is pressed into the reamer shank and jams, especially because the conical seat is also self-locking. The cutter head is hard to remove from the reamer shank, whereby the union pin in particular is subjected to great wear and tear, and damage can even occur. In such reamers with interchangeable cutter heads, there is no provision for equipping the cutter heads with an expanding device.

An expanding reamer is disclosed in U.S. Pat. No. 4,705,435. In this design, the cutter head and reamer shank are made in one piece, the cutter head not being interchangeable. For expanding the cutter head, a screw having a conical head is disposed axially in an opening in the cutter head. The conical head of this screw rests against matching inside surfaces in the cutter head of the reamer. By tightening the screw, the cutter head is forced apart. Wear on the reamer blades can be compensated for by the expandability, thus increasing the life of the tool.

In this design, the coolant-lubricant is introduced through a central bore from the rear through the reamer shank into the interior of the cutter head. Through fine, oblique bores between the reamer blades, the coolant-lubricant is sprayed into the area of these blades. Making the bores between the reamer blades is very expensive. It is less suitable in the case of interchangeable cutter heads since it would further increase the cost of their manufacture.

It is an object of this invention to provide an improved reamer with interchangeable cutter head in which a connection free from play is ensured between the reamer shank and the cutter head.

A further object is to provide a reamer wherein the risk of the connection jamming is eliminated, so that the cutter head can easily be disengaged from the reamer shank.

To this end, in the reamer with interchangeable cutter head according to the present invention, of the type initially mentioned, the improvement comprises the following features:
the coaxial opening in the reamer shank for receiving the cutter head is cylindrical,
an outwardly opening cone, the tapered surface of which is deepened in at least two areas, is disposed at the edge of the end nearest the cutter head of the coaxial opening in the reamer shank,
the cutter head shank has a cylindrical portion which is insertable in the cylindrical coaxial opening,
the cylindrical portion of the cutter-head shank terminates in a thickening forming a cone, and
a clamping bolt which holds the cutter head fast in the reamer shank and presses the cone of the cutter-head shank against the cone of the reamer shank passes through a coaxial opening in the cutter head.

Furthermore, these interchangeable cutter heads are intended to be expanding. At the same time, the coolant-lubricant supply is to be designed in such a way that any kind of cutter head can be used without the necessity of providing the individual cutter heads with additional bores, and that optimum cooling and lubrication are nonetheless ensured for every cutter head.

An optimum seat, free from play, between the reamer shank and the cutter head is achieved when the cone on the reamer shank has three areas which are deepened by grinding and disposed at 120° from one another. When the cutter head is inserted, its cone rests against three points on the counter-cone of the reamer shank, whereby its position is determined. When the clamping bolt is tightened, the points of contact on the cone of the reamer shank are pressed outward. The non-contacting areas are thereby pulled inward. The wall of the reamer shank is also deformed thereby, so that the cylindrical cutter-head shank is additionally held at three locations respectively situated between the points of contact of the cone. The cutter head is thereby held without play. Since the angle of opening is so chosen that no self-locking exists, there is no problem in taking the cutter head out. When the clamping bolt is loosened, the cone of the reamer shank springs back into its original shape. The cutter head is released.

It is further advantageous that the torque is transmitted from the reamer shank to the cutter head, not via the conical seat, but via a follower piece secured in the reamer shank and provided with cams which project into a groove in the cutter head. The follower piece is at the same time provided with an internal thread with which the thread of the clamping bolt meshes.

In order to facilitate threading the clamping bolt in, the follower piece is preferably held in the reamer shank with play so that it can adapt to the clamping bolt during the threading-in process.

Another advantageous design of the invention is achieved by equipping the clamping bolt with a conical head which rests against the matching inside surface of the cutter head. As a result, the cutter head can simultaneously be expanded by means of the clamping bolt without any additional means being necessary.

Because the cutter heads are interchangeable, the supply of coolant-lubricant preferably takes place from the outside, i.e., not through the cutter head. The coolant-lubricant comes out of an annular nozzle mounted in the reamer shank and flows along the circumferential surface of the reamer shank over the cutter head surface to the blades. Regardless of the arrangement of the blades in the inserted cutter head, cooling and lubrication are optimal at all times.

A preferred embodiment of the invention will now be described in detail with reference to the accompanying drawings, in which.

Figure 1:
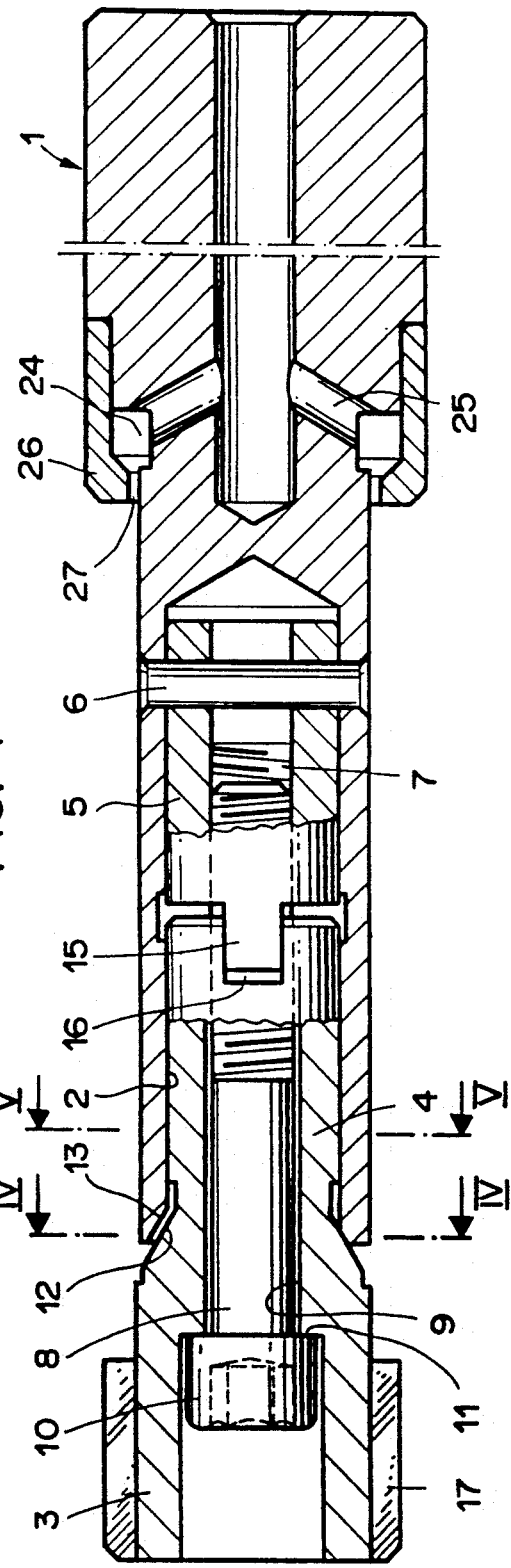
FIG. 1 is a sectional view of a reamer with interchangeable cutter head without expansion.

A reamer shank 1 as shown in FIG. 1 has a coaxial opening 2 in which a cutter-head shank 4 of a cutter head 3 can be inserted. Opening 2 is cylindrical. Lodged at the bottom of opening 2 is a follower piece 5 held by a transverse pin 6 passing through both follower piece 5 and the wall of reamer shank 1. For securing pin 6, it is flattened out at each end like a rivet. Pin 6 is seated on follower piece 5 with play, as piece 5 also has a certain amount of play relative to the wall of reamer shank 1. Within follower piece 5 is an internal thread 7 into which a clamping bolt 8 can be screwed.

Figure 4:
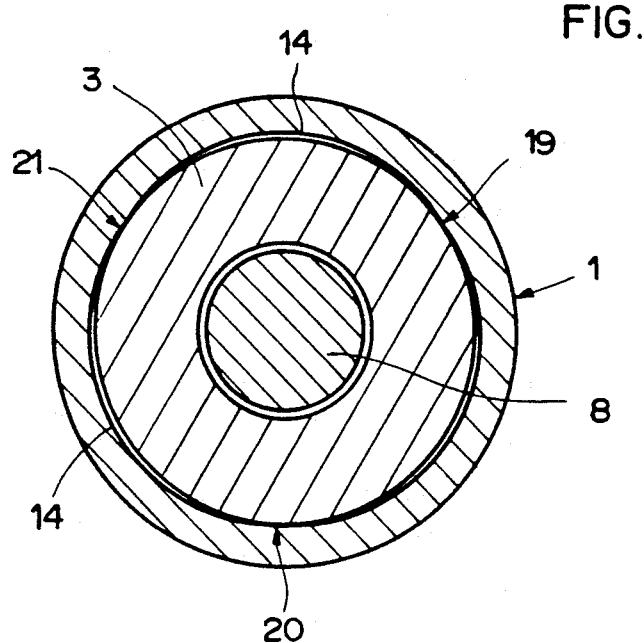
FIG. 4 is a section taken on the line IV—IV of FIG. 1 with non-tightened clamping bolt.

Clamping bolt 8 passes through a coaxial opening 9 in cutter head 3, and the cylindrical head 10 thereof comes to rest against an annular surface 11, so that cutter head 3 can be screwed fast in reamer shank 1. Affixed to cutter-head shank 4 is a cone 12 having an inclination on the order of from 45° to 60° and tapering toward cutter-head shank 4. The wall forming coaxial opening 2 of reamer shank 1 terminates at the end thereof nearest cutter head 3 in an outwardly opening cone 13 matching cone 12 of cutter-head shank 4. The tapering surface of cone 13 has deepened portions 14, as shown in FIG. 4. Deepened portions 14 are machined by grinding out to a depth in the range of from 0.2-0.4 mm at three locations of cone 13 which are mutually offset by an angle of 120°.

Figure 2:
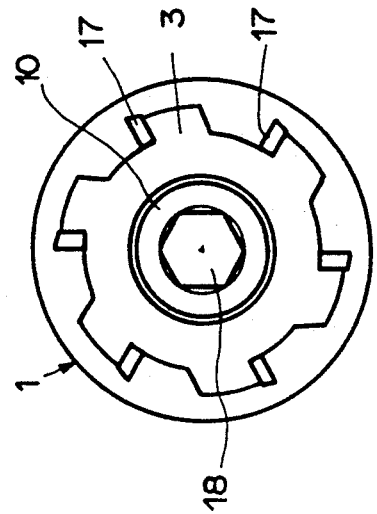
FIG. 2 is a top plan view of a cutter head design.

At the end of follower piece 5 nearest cutter head 3 are two cams 15 which engage a groove 16 in cutter head 3 when the latter is inserted. This form-locking connection transmits the torque from reamer shank 1 to cutter head 3. FIG. 2 is an elevation, partly in section, of cutter head 3 with the respectively mounted cutter blades 17. Clamping bolt 8 includes a recessed hexagon 18 by means of which clamping bolt 8 can be screwed in and out.

For inserting a cutter head 3 in a reamer shank 1, cylindrical cutter-head shank 4 slides into the cylindrical coaxial opening 2 of reamer shank 1. Cutter head 3 must be twisted in such a way that cams 15 of follower piece 5 engage groove 16 of cutter-head shank 4. Cone 12 of cutter-head shank 4 and cone 13 of reamer shank 1 now rest against one another. Clamping bolt 8 can now be screwed into follower piece 5.

FIG. 4 illustrates the relative positions of cones 12 and 13 when bolt 8 is not tightened. Cone 12 of cutter head 3 rests against cone 13 of reamer shank 1 at only three points 19, 20, and 21. At the deepened portions 14, which are shown enlarged, a gap exists.

Figure 5A:
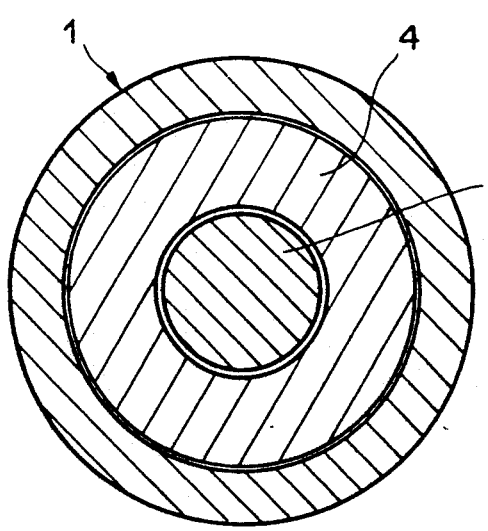
FIGS. 5a and 5b are sections taken on the line V—V of FIG. 1 with non-tightened and tightened clamping bolt, respectively.

Cutter-head shank 4 lies in coaxial opening 2 of reamer shank 1, as shown in FIG. 5a, where the clearance between cutter-head shank 4 and the wall of opening 2 is shown greatly enlarged.

When clamping bolt 8 is tightened, cone 12 of cutter head 3 is pressed into cone 13 of reamer shank 1. Points 19, 20, and 21 of cone 13 of reamer shank 1, contacting cone 12 of cutter head 3, are thereupon pressed radially outward. Since the wall of reamer shank 1 is not very thick, being only about 10% of the diameter of reamer shank 1 in the region of coaxial opening 2, traction is produced on the non-contacting locations provided with deepened portions 14, thus causing these locations to be pulled radially inward.

Figure 5B:
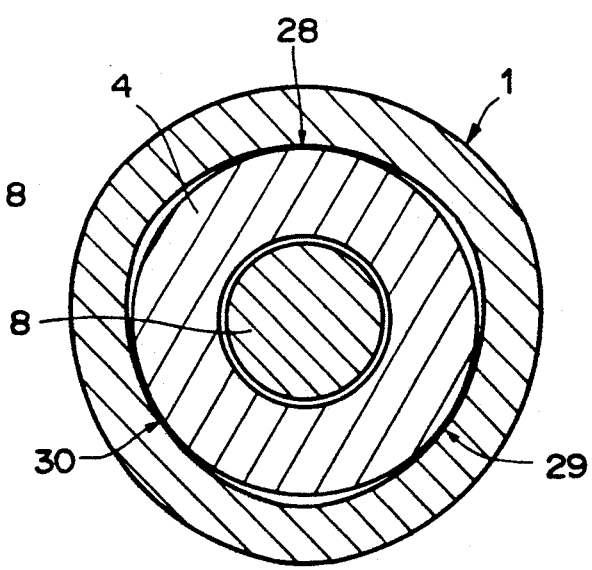

This deformation also affects the end region of the wall of reamer shank 1 nearest cutter head 3. The wall is deformed in this region in such a way, shown in FIG. 5b, that locations 28, 29, and 30 are pressed against cutter-head shank 4.

Cutter head 3 is thereby held without play in reamer shank 1 at the three points 19, 20, and 21 on cone 12, since the areas of cone 13 provided with deepened portions 14 never come in contact with cone 12, and at the three locations 28, 29, and 30 on cutter-head shank 4. These locations of the wall which are pressed against cutter-head shank 4 by the deformation extend over a certain length of cutter-head shank 4.

This mounting of cutter head 3 on its cone 12 and along its cylindrical cutter-head shank 4 results in a very stable connection, free from play, between reamer shank 1 and cutter head 3.

When clamping bolt 8 is loosened, the elastically deformed cone 13 automatically returns to its original shape, the wall of reamer shank 1 likewise resumes its original shape, and since the angle of cones 12, 13 is such that no self-locking occurs, cutter head 3 is automatically released from the connection.

Figure 3:
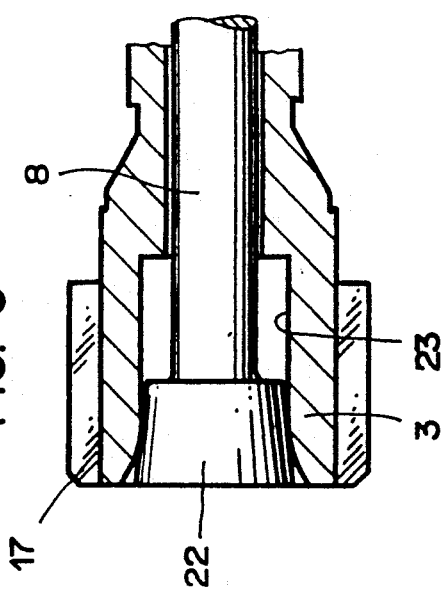
FIG. 3 is a sectional view of an expanding cutter head.

Clamping bolt 8 can be provided with a conical head 22, as illustrated in FIG. 3. The inside surface 23 of the bolt-head hole of cutter head 3 has at its outer end an arcuate shape, against which conical head 22 of clamping bolt 8 rests. Through tightening of clamping bolt 8, the front end of cutter head 3 is pressed apart, thus enlarging the diameter of cutter head 3, which corresponds to the desired expanding. The degree of such expanding is in the range of thousandths to hundredths of a millimeter.

Consequently, in the present case, clamping bolt 8 is used for securing cutter head 3 to reamer shank 1, on the one hand, and for expanding the cutter head 3, on the other hand. Upon tightening of clamping bolt 8, owing to the slenderness of the wall, first enlargement of cone 13 of reamer shank 1 takes place until an optimum connection is achieved between cutter head 3 and reamer shank 1, before an enlargement of cutter head 3, which is no longer in the range of diametral tolerance of the reamer, takes place by means of conical head 22 of clamping bolt 8.

By exchanging the clamping bolt 8 having a conical head 22 for one having a cylindrical head, a non-expanding cutter head 3 can also be utilized with the same reamer shank 1. In that case, clamping bolt 8 rests against the flat bore bottom of cutter head 3.

According to FIG. 1, the feed of coolant-lubricant takes place via a central bore 23 in the rear area of reamer shank 1. Machined into reamer shank 1 is a circular groove 24 which communicates via transverse bores 25 with central bore 23. Slipped over circular groove 24 is a cover cap 26 which, together with groove 24, forms an annular duct closed at the rear. Toward cutter head 3, cap 26 has an annular nozzle 27 through which the coolant-lubricant is sprayed under pressure along the surface of reamer shank 1 up to cutter head 3. Cutter blades 17 of cutter head 3 are thereby provided optimally with coolant-lubricant independently of how the teeth of the cutter heads are designed. Since the distance between cutter blades 17 of cutter head 3 and annular nozzle 27 is not very great, the stream of coolant-lubricant has no difficulty in spanning that distance.

What is claimed is:

1. A reamer of the type having an interchangeable cutter head, a reamer shank, threaded coupling parts for mounting said cutter head in said reamer shank, means for transmitting torque from said reamer shank to said cutter head, and a coolant-lubricant supply, wherein the improvement comprises:
   a cylindrical coaxial opening in one end of said reamer shank for receiving said cutter head,
   an outwardly opening first cone disposed at the edge of said coaxial opening nearest said cutter head and having a tapered surface including two or more deepened portions,
   a cutter-head shank having a cylindrical portion adapted for insertion in said cylindrical coaxial opening and terminating in a thickening forming a second cone,
   a further coaxial opening in said cutter head, and
   a clamping bolt passing through said further coaxial opening for holding said cutter head fast in said reamer shank and for pressing said second cone against said first cone.

2. The reamer of claim 1, wherein said tapered surface of said first cone includes three said deepened portions offset from one another by 120°.

3. The reamer of claim 1, wherein said cutter-head shank includes a groove disposed on the end face thereof remote from said cutter head, said reamer further comprising a follower piece having an internal thread, a transverse bore, and two cams disposed at the end of said follower piece nearest said cutter head, and a pin passing through said transverse bore and through the wall of said reamer shank for holding said follower piece at the bottom of said cylindrical coaxial opening, said cams being adapted to engage said groove when said cutter-head shank is inserted in said cylindrical coaxial opening.

4. The reamer of claim 3, wherein said follower piece is inserted with play in said cylindrical coaxial opening, and said pin passes with play through said transverse bore.

5. The reamer of claim 1, wherein the edge of said further coaxial opening nearest said reamer shank takes the form of an inwardly tapering conical surface, said clamping bolt having a threaded portion and a head tapering toward said threaded portion and adapted to rest against said tapering conical surface, said cutter head being fixed in said reamer shank and being expandable by means of said clamping bolt.

6. The reamer of claim 1, wherein the edge of said further coaxial opening nearest said reamer shank takes the form of an inwardly tapering arcuate surface, said clamping bolt having a threaded portion and a head tapering toward said threaded portion and adapted to rest against said tapering arcuate surface, said cutter head being fixed in said reamer shank and being expandable by means of said clamping bolt.

7. The reamer of the claim 1, wherein the end of said reamer shank remote from said cutter head includes a blind bore for receiving said coolant-lubricant, said reamer shank further comprising at least one transverse bore, an encircling channel communicating with said blind bore via said transverse bore, and a covering cap surrounding said channel to form an annular duct and including an annular nozzle, whereby said coolant-lubricant pressed via said blind bore and said transverse bore into said annular duct is dischargeable along said reamer shank toward said cutter head.

* * * * *